United States Patent [19]

Field

[11] Patent Number: 4,723,279
[45] Date of Patent: Feb. 2, 1988

[54] LINE USE INDICATOR IN A TELEPHONE SET

[75] Inventor: Ronald G. Field, London, Canada

[73] Assignee: Northern Telecom Limited, Montreal, Canada

[21] Appl. No.: 25,239

[22] Filed: Mar. 12, 1987

[51] Int. Cl.$^4$ .............................................. H04M 1/72
[52] U.S. Cl. .................................................... 379/396
[58] Field of Search ......................... 379/396, 376, 380

[56] References Cited

U.S. PATENT DOCUMENTS 4,653,094 3/1987 Rasmussen et al. ............ 379/376 X

Primary Examiner—Stafford D. Schreyer

[57] ABSTRACT

A line use indicator in a telephone set, to indicate a telephone line is in use when a plurality of telephone sets are paralleled on the line, comprises a light emitting device switched by a transistor, the transistor controlled by a VMOS FET. The transistor may switch a separate power source or a self-contained power source from the telephone line.

9 Claims, 2 Drawing Figures

LINE USE INDICATOR IN A TELEPHONE SET

BACKGROUND OF THE INVENTION

1. Field of the Invention

This invention relates to line use indicators for telephone sets and, in particular, relates to an indicator for showing a telephone line is in use where there is a plurality of telephone sets paralleled on the line.

2. Related Art

When two, or more, telephones are connected to one telephone line, it is at least inconvenient if someone starts to use one telephone set when someone else is already using another telephone set. It has been proposed to provide a lighted indication of the line being in use, but the switch requirements for controlling the light of the indicator are very difficult while also meeting telephone company specification for "on-hook" resistance.

SUMMARY OF THE INVENTION

The present invention provides a switching circuit which draws less than 1 μA, well within the specifications set by telephone companies. In one form of the switching circuit, powered from the telephone line, it controls a light emitting device (LED) which is itself powered from a separate power source. In an alternative form, the switching circuit and the light emitting device are powered from the telephone line.

BRIEF DESCRIPTION OF THE DRAWINGS

The invention will be readily understood by the following description of certain embodiments, by way of example, in conjunction with the accompanying drawings, in which.

DETAILED DESCRIPTION OF THE DRAWINGS

Figure 1:
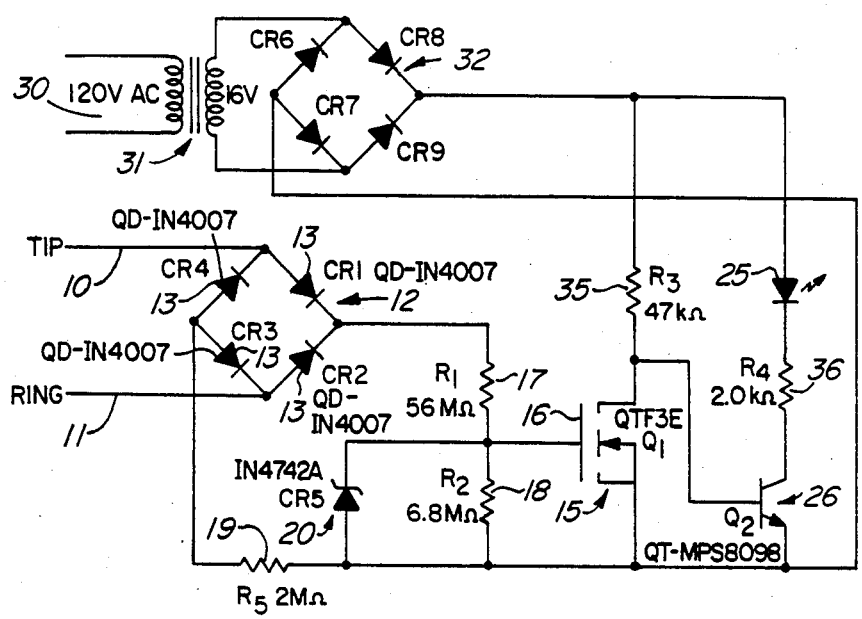
FIG. 1 is a diagrammatic circuit for one form of switch and indicator arrangement.

FIG. 1 illustrates an arrangement in which the switching circuit is powered from the telephone line, while the indicator is separately powered. As shown, the Tip and Ring conductors 10 and 11 are connected to a diode bridge 12 in which the diodes 13 have a 1000 volt PIV rating to avoid breakdown due to lightning surges.

A VMOS FET 15 forms a switch. The gate 16 of the FET 15 is connected to one side of the bridge 12 via a resistor 17 and to the other side of the bridge via resistors 18 and 19. A zener diode 20 is connected between the gate of the FET 15 and the conductor 21 in which are positioned the resistors 18 and 19. Zener diode 20 is a 12 volt diode and protects the gate 16 of the FET 15 from damaging voltages.

The indicator, in the example an LED 25, is switched on and off by the transistor 26. The transistor 26 is actuated by the FET 15. The gate of the FET exhibits extremely high impedance, drawing essentially no current. When a telephone is in use, that is, off-hook, the FET is held off and the transistor 26 conducts, causing the LED to be lighted. When the telephone is not in use (on-hook) the FET is turned on, preventing the transistor 26 from conducting.

The LED 25 is fed from a 120 volt AC supply at 30, via a transformer 31 and rectifier 32, at 16 volts DC. The LED is a low current LED. A typical example of telephone line specifications is the requirement that a telephone set have an on-hook resistance of at least 10 MΩ. The open circuit voltage of the central office battery is normally 48 volts, which drops to around 15 volts at the telephone set when off-hook. To detect the line voltage change, some current must be drawn. At a voltage of 48 volts, 4.8 μA, is the maximum allowed. The arrangement illustrated in FIG. 1 draws less than 1 μA.

Various items of the circuit serve particular purposes. Thus the resistor 17 has a high value to minimize current drain from the telephone line when the set is on-hook. It is possible to use the high value in view of the use of the VMOS FET 15. Resistor 18 is chosen to set the LED 25 on/off threshold. It works in conjunction with resistor 17 as a voltage divider. The LED 25 lights whenever the Tip and Ring voltage is between 0 volts and some upper limit. This upper limit is adjustable by changing the value of resistor 18. A larger value lowers the upper limit and a smaller value raises it. Resistor 35 provides base current for the transistor 26, resistor 36 sets the desired illumination of LED 25, and resistor 19 provides some isolation between telephone line and LED power supply. Typical values for the resistors are indicated in FIG. 1. The diodes identified as CR6, 7, 8 and 9 can be QDIN4002 diodes, or they can be replaced by a QDVE08 diode bridge.

Figure 2:
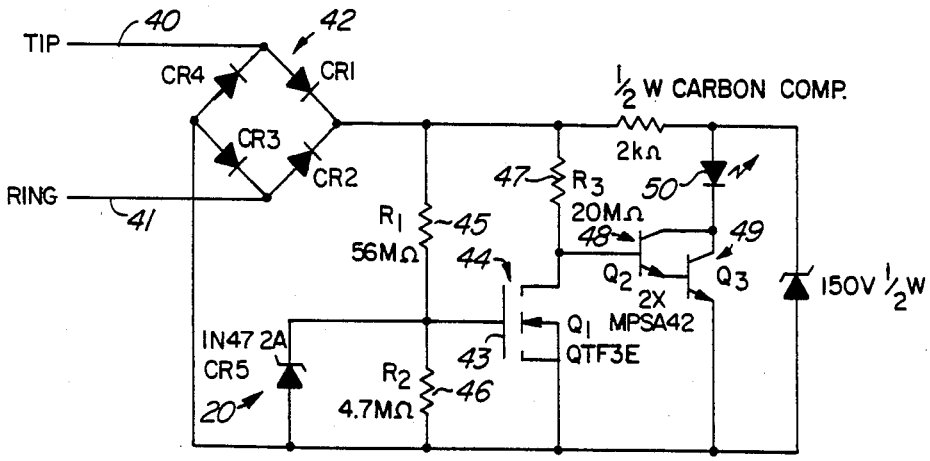
FIG. 2 is a diagrammatic circuit for another form of switch and indicator arrangement.

FIG. 2 illustrates an arrangement in which the LED is also line powered. Tip and Ring conductors 40 and 41 connect to the bridge 42. The gate 43 of VMOS FET 44 is connected via resistors 45 and 46 across the bridge 42. The two diodes 48 and 49 form a Darlington arrangement, and act as a switch for the LED 50, the switch actuated by the FET 44. Resistor 47 provides base current for the Darlington arrangement 48/49. In this example, the LED 50 is a high efficiency low current LED.

What is claimed is:

1. A line use indicator in a telephone set, comprising a switching circuit and a light emitting device, said switching circuit comprising a bridge across Tip and Ring conductors in the telephone set; a VMOS FET connected between one side of said bridge and a power source, and including a first resistor between said FET and said power source, the gate of the FET being connected to the one side of the bridge through a second resistor and being connected to the other side of the bridge by a third resistor; a transistor having its base connected to a junction between said FET and said first resistor; said light emitting device and said transistor in series between said one side of said bridge and said power source, the arrangement such that at a normal voltage at said bridge said FET is in an on condition, holding said transistor in an open condition, and lowering of said voltage opening said FET, said transistor switching to a conducting condition and lighting said light emitting device.

2. An indicator as claimed in claim 1, said second resistor being in two parts in series, a first part connected to said gate and a second part connected to said one side of said bridge, and a zener diode connected between said gate and a junction between the two parts of said second resistor, said zener diode operative to protect the gate of the FET.

3. An indictor as claimed in claim 1, said third resistor of a high value to restrict current drain when said FET is in the on condition.

4. An indicator as claimed in claim 2, said first part of said second resistor of a value to set the light emitting device on/off threshold.

5. An indicator as claimed in claim 4, said second part of said second resistor providing isolation between the bridge and the power source.

6. An indicator as claimed in claim 1, including a fourth resistor between the base of said FET and said power source.

7. An indicator as claimed in claim 1, said power source being said other side of said bridge.

8. An indicator as claimed in claim 1, said power source being a source separate from said Tip and Ring conductors.

9. An indicator as claimed in claim 3, said current less than 1 $\mu$A.

* * * * *